AUTOMATIC POWER WASHING APPARATUS

Filed July 27, 1962 8 Sheets-Sheet 1

INVENTORS
DEWEY M. EVANS
JAMES H. PATRICK
JOHN L. RUDLAFF
LE LAND C. WEATHERS
BY
Curtis, Morris and Safford
ATTORNEYS

AUTOMATIC POWER WASHING APPARATUS

Filed July 27, 1962 8 Sheets-Sheet 2

INVENTORS
DEWEY M. EVANS
JAMES H. PATRICK
JOHN L. RUDLAFF
LELAND C. WEATHERS
BY
Curtis, Morris and Safford
ATTORNEYS Oct. 20, 1964 D. M. EVANS ETAL 3,153,419

AUTOMATIC POWER WASHING APPARATUS

Filed July 27, 1962 8 Sheets-Sheet 3

INVENTORS
DEWEY M. EVANS
JAMES H. PATRICK
JOHN L. RUDLAFF
LE LAND C. WEATHERS

BY Curtis, Morris, and Safford
ATTORNEYS

Oct. 20, 1964 D. M. EVANS ETAL 3,153,419

AUTOMATIC POWER WASHING APPARATUS

Filed July 27, 1962 8 Sheets-Sheet 4

INVENTORS
DEWEY M. EVANS
JAMES H. PATRICK
JOHN L. RUDLAFF
LELAND C. WEATHERS

BY

Curtis, Morris and Safford
ATTORNEYS

AUTOMATIC POWER WASHING APPARATUS

INVENTORS
DEWEY M. EVANS
JAMES H. PATRICK
BY JOHN L. RUDLAFF
LELAND C. WEATHERS

Curtis, Morris and Safford
ATTORNEYS

AUTOMATIC POWER WASHING APPARATUS

Filed July 27, 1962 8 Sheets-Sheet 6

INVENTORS
DEWEY M. EVANS
JAMES H. PATRICK
JOHN L. RUDLAFF
LELAND C. WEATHERS
BY
Curtis, Morris and Safford
ATTORNEYS Oct. 20, 1964 D. M. EVANS ETAL 3,153,419

AUTOMATIC POWER WASHING APPARATUS

Filed July 27, 1962 8 Sheets-Sheet 7

INVENTORS
DEWEY M. EVANS
JAMES H. PATRICK
JOHN L. RUDLAFF
LE LAND C. WEATHERS

BY

Curtis, Morris and Safford
ATTORNEYS

AUTOMATIC POWER WASHING APPARATUS

Filed July 27, 1962 8 Sheets-Sheet 8

INVENTORS
DEWEY M. EVANS
JAMES H. PATRICK
JOHN L. RUDLAFF
LELAND C. WEATHERS
BY
Curtis, Morris and Safford
ATTORNEYS 3,153,419
Patented Oct. 20, 1964

3,153,419

AUTOMATIC POWER WASHING APPARATUS

Dewey M. Evans, Pinckney, James H. Patrick, Detroit, John L. Rudlaff, Plymouth, and Leland C. Weathers, Livonia, Mich., assignors to Ajem Laboratories, Inc., Livonia, Mich.

Filed July 27, 1962, Ser. No. 212,926
10 Claims. (Cl. 134—133)

The present invention relates to automatic power washing apparatus adapted for use in mass production industrial applications for thoroughly cleaning the inside and outside of complex manufactured articles. This invention is described as embodied in an automatic machine for high pressure washing and drying of parts of an internal combustion engine, such as the engine block and head blocks prior to assembly.

In many mass-production types of industrial applications involving the fabrication of complex machine or engine parts and assemblies, it is necessary at one or more points in the production schedule to remove the various soil materials and chips which adhere to the internal and external surfaces of the manufactured component and accumulate as a result of previous manufacturing and fabrication steps. The types of soil materials which accumulate on and within these manufactured components include dirt particles, lubricating and cutting compounds or abrasives from previous cutting, machining or grinding operations, metal particles and chips. There are exacting requirements for thorough, rapid, efficient and completely automatic cleaning of these manufactured components internally and externally, because in modern machinery and engines, the manufactured components are held to very close tolerances, and the operating surfaces are finished to an extremely high precision. The presence of minute quantities of soil materials cause damage by corrosion and scouring after the components are assembled and operated. The type of automatic machine described herein as embodying the methods and apparatus of the present invention provides a thorough cleaning of the cavities and passages as well as the exterior surfaces of engine blocks, engine heads, transmission cases and similar complex machine or engine components.

In the machine described herein as embodying the present invention, the manufactured components to be cleansed are loaded into fixtures which revolve about a main axis and at the same time rotate about their own axes, the latter being perpendicular to the main axis. Thus, the components are moved from station-to-station within the machine and are turned to different angular positions for producing various desired internal flow patterns so as to remove all of the soil materials from the cavities and passages therein. These revolving and rotating fixtures each include their individual washing manifolds which move in cooperative relationship with the component being cleansed for directing the washing liquid internally and externally onto all the desired surfaces of the components as they are moved into various advantageous positions. A sustained internal washing action over a substantial period of time with high pressure washing liquid is provided, and nevertheless, a rapid production rate is achieved.

Among the many advantages of the machine described herein as an illustrative embodiment of the invention are those resulting from the fact that a precisely controlled internal and external washing action is provided so as to assure the complete cleansing of the component, but at the same time, the component is advanced rapidly through the machine so that a high production rate is obtained.

Another advantage of this machine results from its ability to receive the components in one position as received from the preceding production line and to revolve and to rotate the components through a wide variety of different angular positions before the component is discharged from the machine. Thus, the various internal cavities and passages are individually purged with washing liquid travelling in the most advantageous flow direction for each region being cleansed.

Among the further advantages of this machine are those resulting from the fact that the washing liquid is supplied through a centrally controlled flow system concentric with the axis of revolution of the individual fixtures and is supplied to individual washing manifolds which are supported by the fixtures and move with the fixtures. Each washing manifold maintains a precise relationship with respect to the manufactured component being washed as it revolves and rotates and thus produces an intense washing action upon the desired internal and external surfaces of the component. Moreover, the centrally controlled flow system provides a surging pulsating flow pattern of controllable frequency for thoroughly cleansing the cavities and passages within the component.

The various objects, aspects, features and advantages of the present invention will be in part pointed out and will be in part understood from the following description considered in conjunction with the accompanying drawings, in which.

Figure 1:
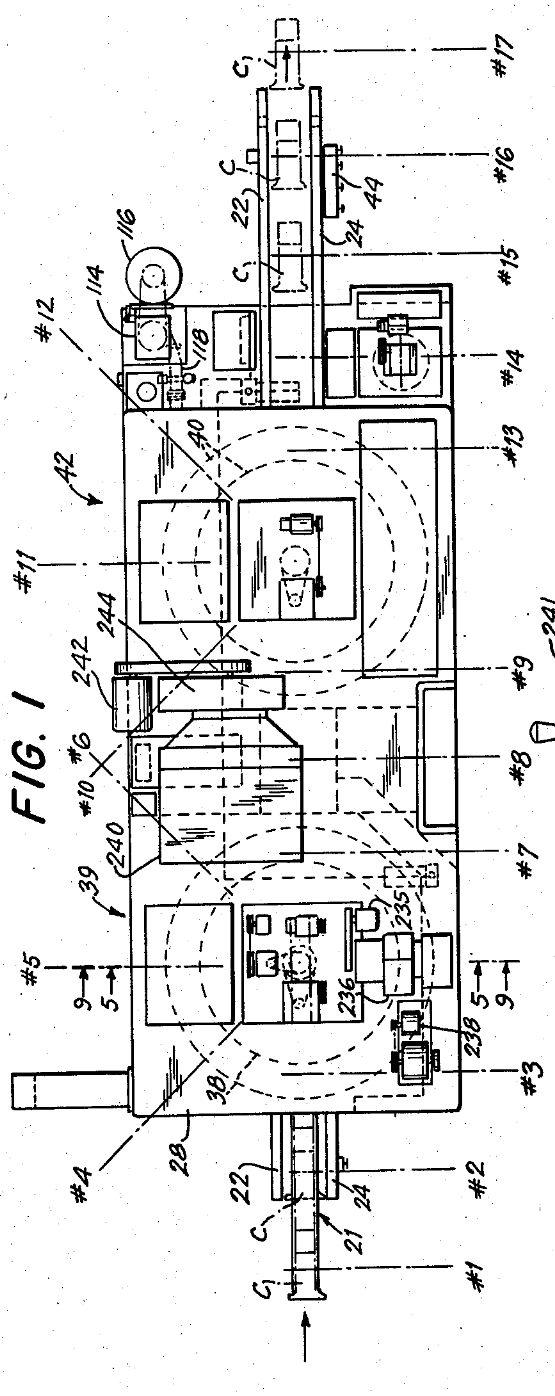
FIGURE 1 is a top plan view of a machine embodying the present invention for internally and externally washing the machined blocks of internal combustion engines, such as automobile engines, with the location of certain interior parts of the machine being indicated by dashed lines.
Figure 2:
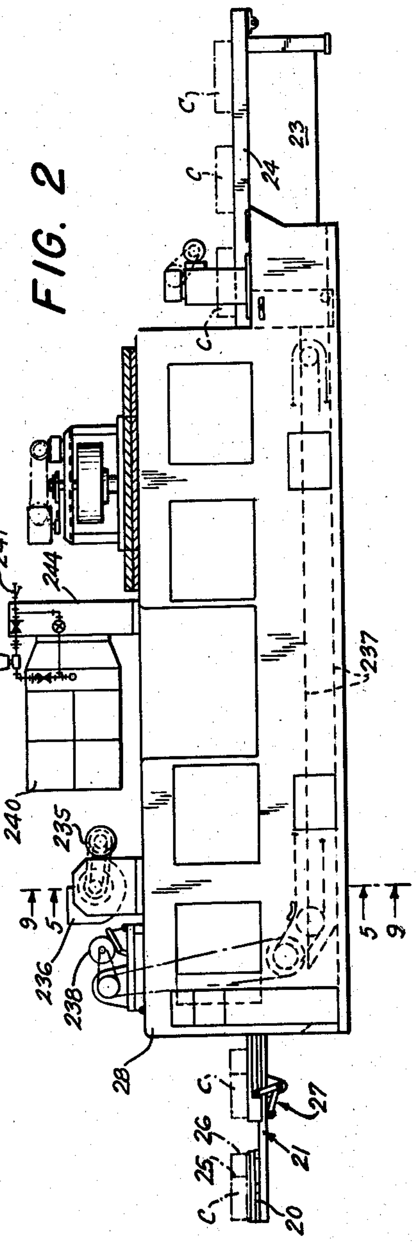
FIGURE 2 is a side elevational view of the machine of FIGURE 1 also with the location of certain interior parts of the machine being indicated by dashed lines.
Figure 5:
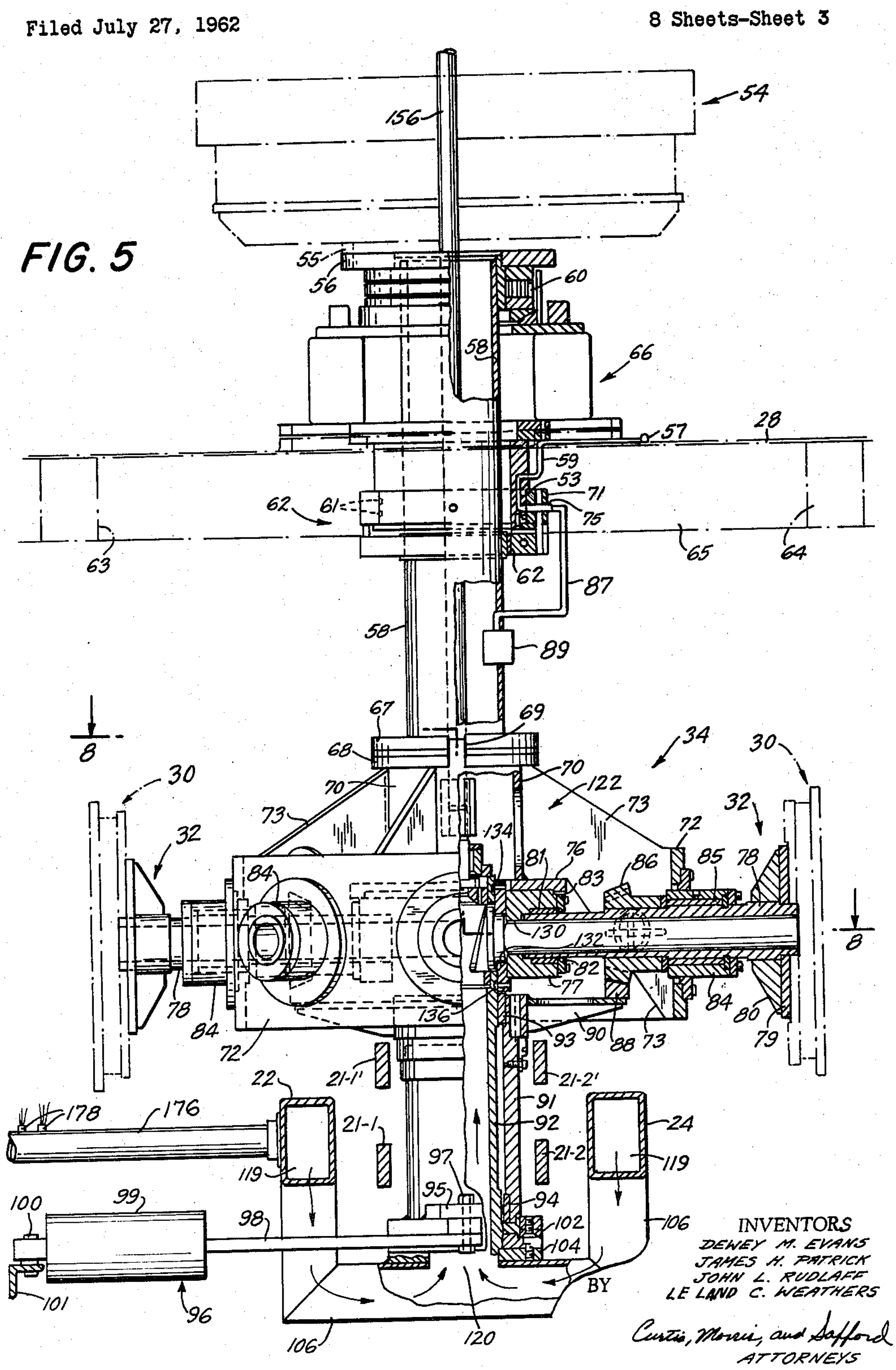
Figure 5A:
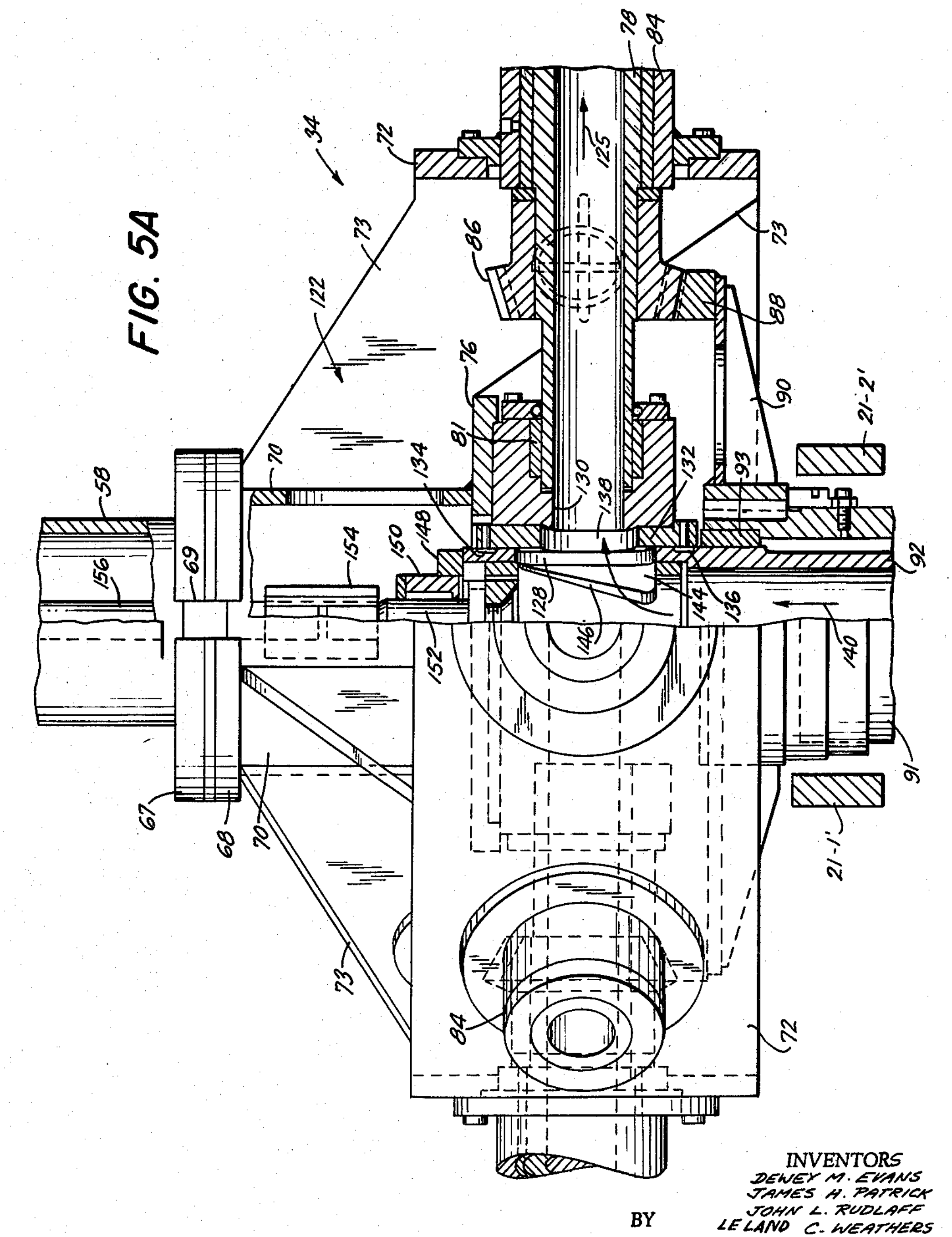
Figure 6:
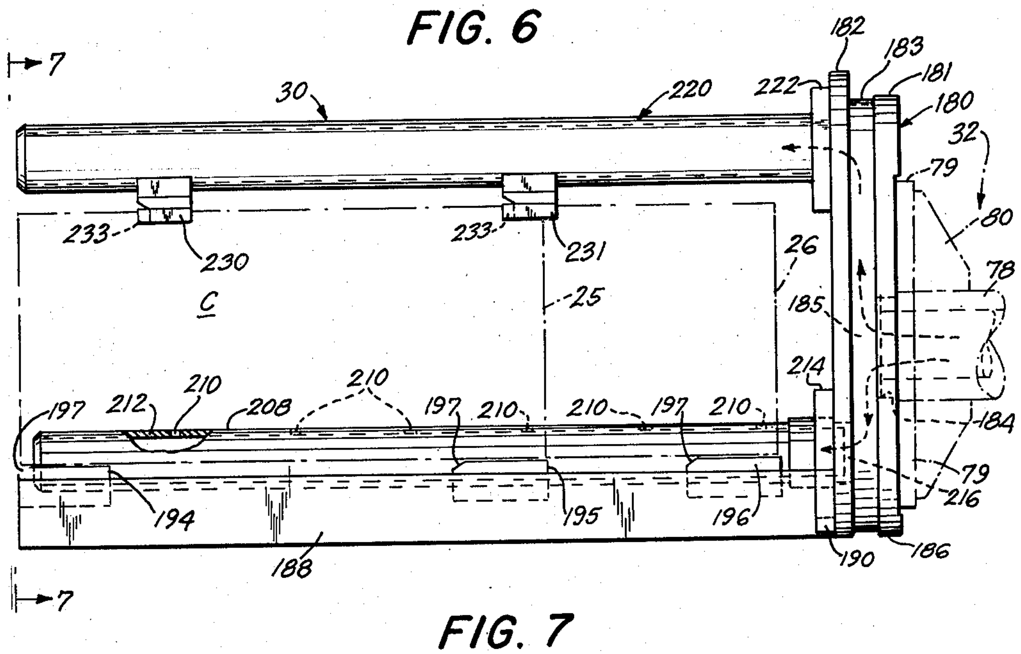
Figure 7:
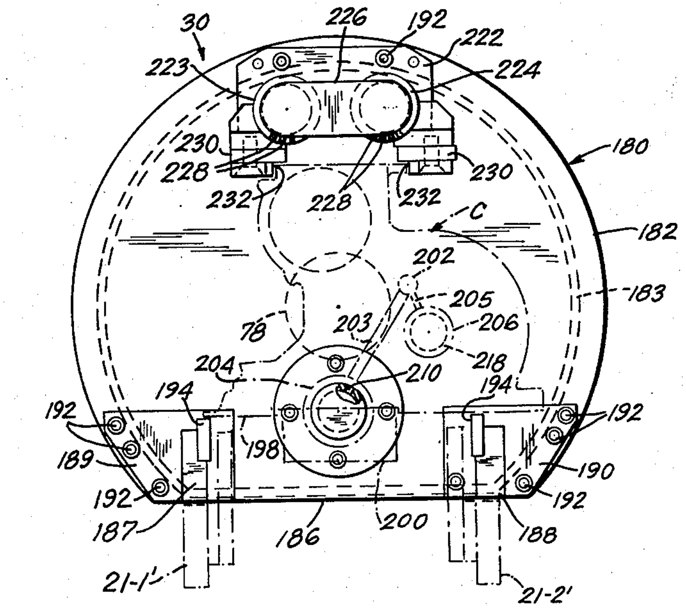
Figure 8:
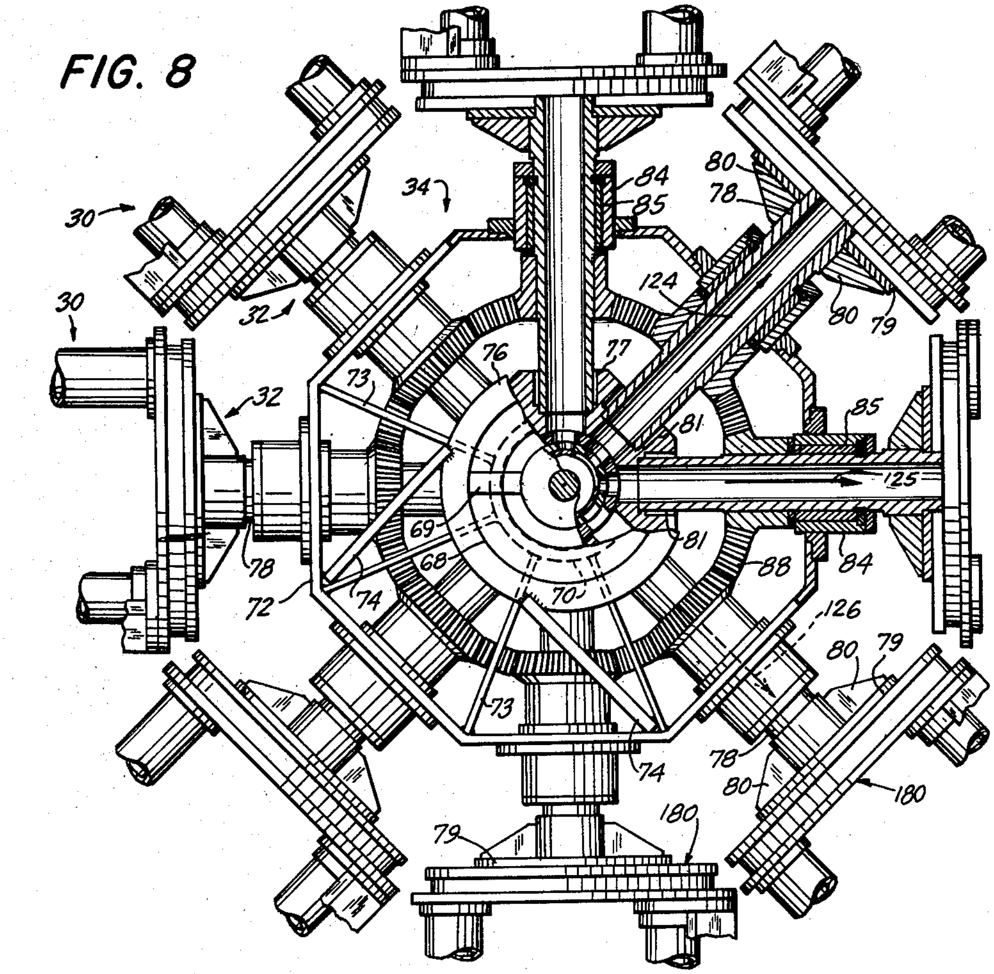
Figure 9:
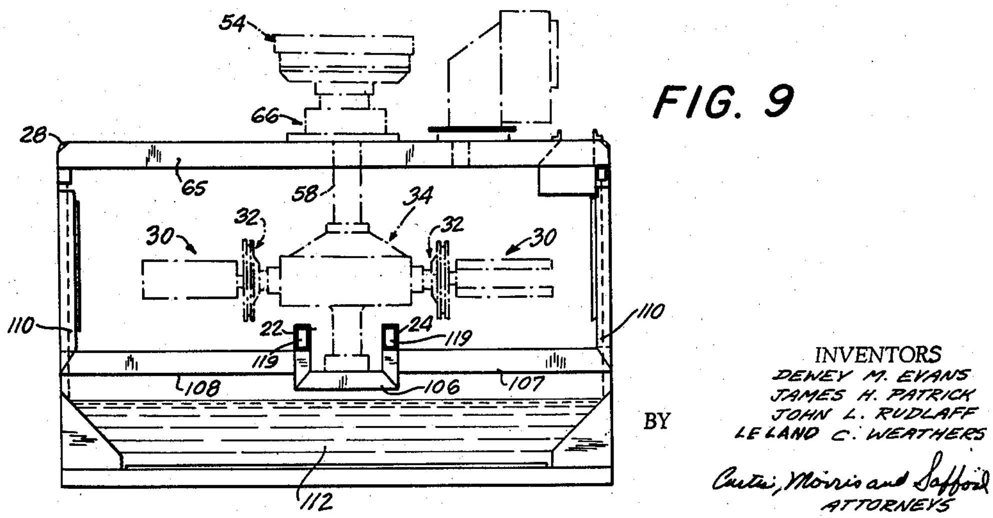
Figure 8A:
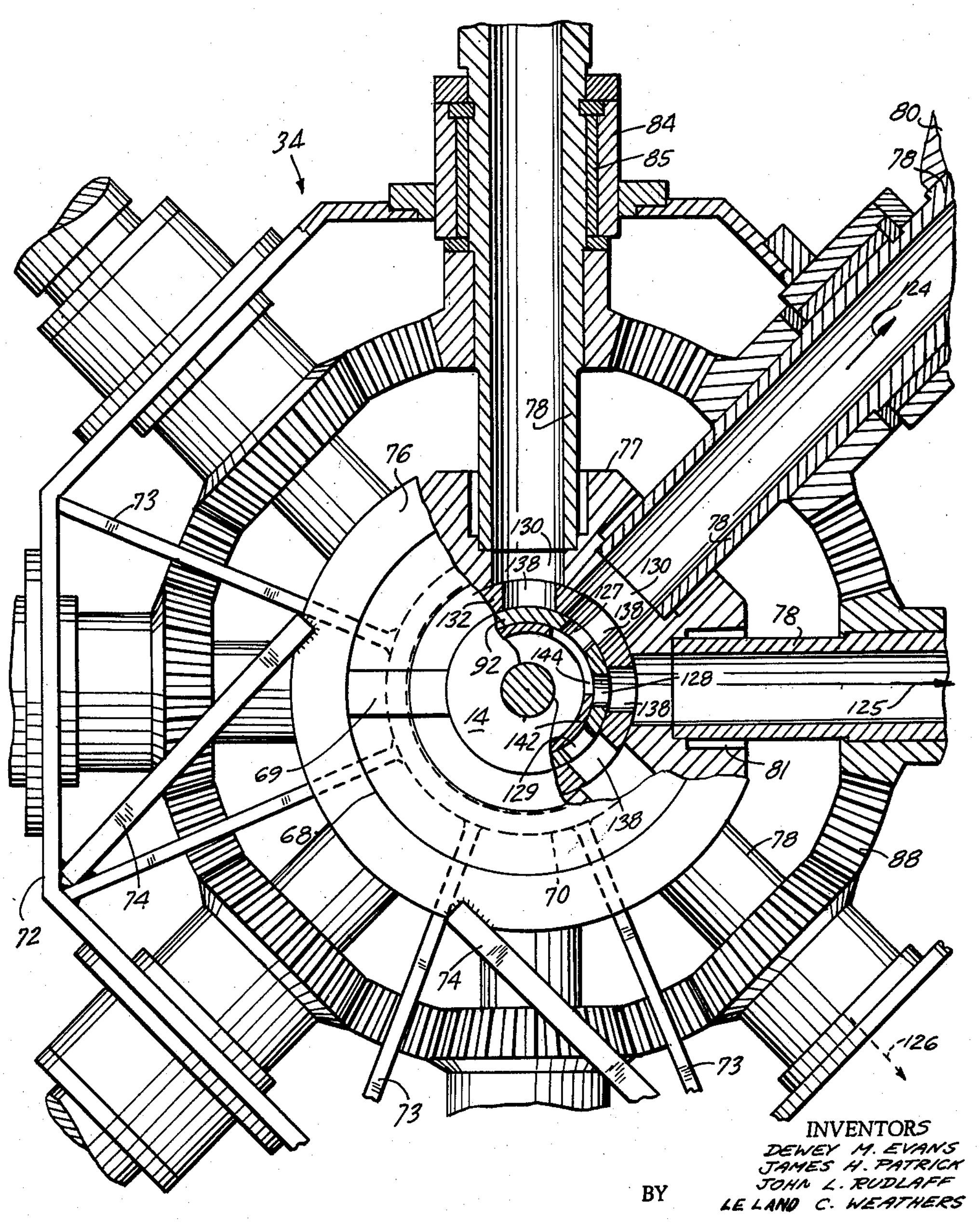
Figure 10:
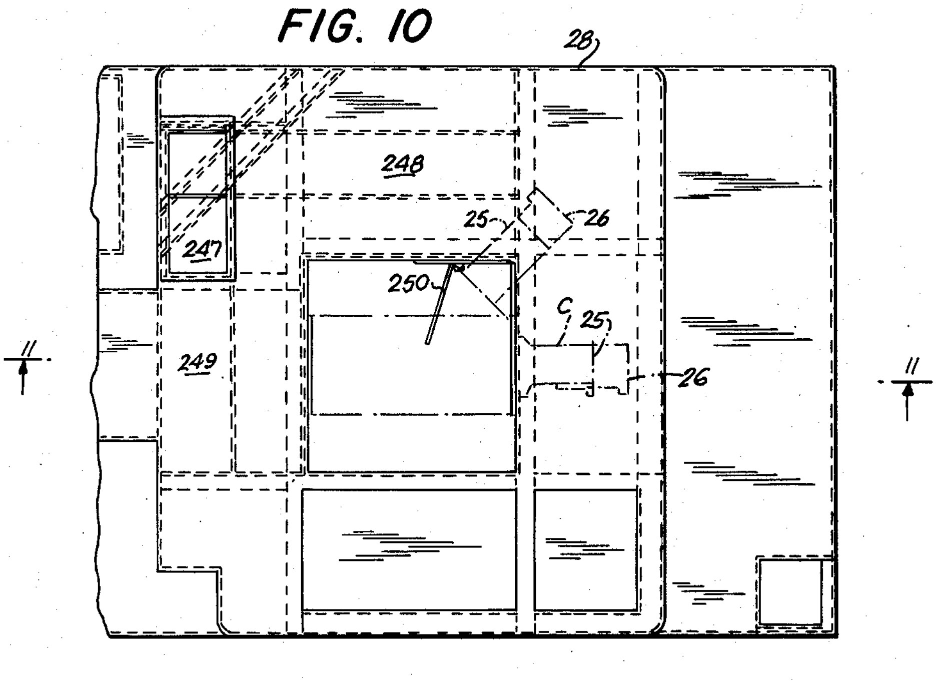
Figure 11:
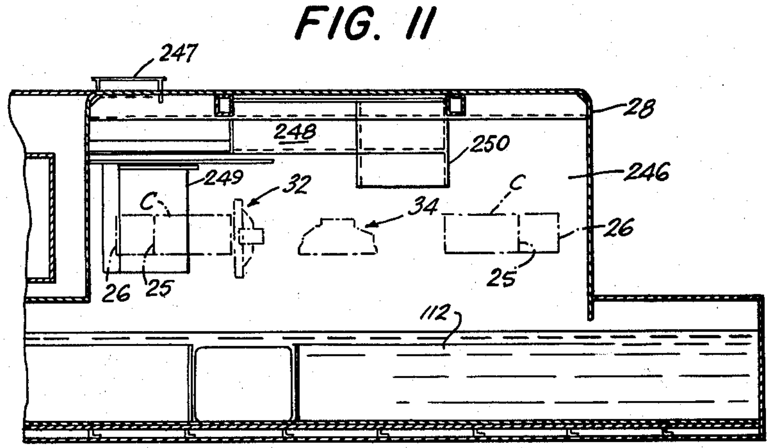

FIGURE 5 is an end elevational and partial sectional view taken along the line 5—5 of FIGURE 1 and showing the indexing carriage apparatus for revolving the manufactured components from station-to-station including rotatable radial arms for rotating the components into various desired angular positions together with central flow surge control means for controlling the washing fluid supplied to the components being handled. In this illustrative embodiment of the invention, the manufactured components being automatically washed and dried are machine engine blocks for six-cylinder or four-cylinder automobile engines;

FIGURE 5A is an illustration on enlarged scale of the central portion of FIGURE 5, showing the central flow surge control means;

FIGURE 6 is a side elevational view of one of the component supporting fixtures which are attached to the outer ends of the rotatable radial arms, this FIGURE 6 being shown on a scale slightly larger than FIGURE 5;

FIGURE 7 is an end view of the fixture of FIGURE 6 as seen looking from the left margin toward the right in FIGURE 6;

FIGURE 8 is a plan view, partially in section, taken generally along the line 8—8 of FIGURE 5, showing the revolving carriage apparatus and the rotatable radial arms with the component-holding fixtures attached thereto. Also, the flow of the washing fluid is illustrated in FIGURE 8;

FIGURE 8A is an illustration on enlarged scale of the central portion of FIGURE 8, showing further features of the central flow surge control means;

FIGURE 9 is a cross-sectional view of the machine of FIGURES 1 and 2, being taken along the line 9—9 of FIGURES 1 and 2, looking toward the right;

FIGURE 10 is a top plan view on enlarged scale of the right end section of the machine of FIGURES 1 and 2. This right end section is the blow-off section wherein the manufactured components which have been thoroughly washed in the machine are dried off by blasts of air directed at particular angles before the component is automatically delivered out of the machine; and FIGURE 11 is a longitudinal elevational sectional view of this machine, the sectional view being taken along the line 11—11 in FIGURE 10.

In the automatic machine shown in FIGURES 1 and 2, the manufactured components C, which are illustratively shown by way of example as internal combustion engine blocks after machining, are transferred in sequence from a production line at the left end of the machine (not shown) to a first station 1 at the input end of the machine. The machined block C is delivered to station 1 in position with the pan rail down and the front end of the block leading, i.e. toward the right. This component C is moved through the machine by suitable transfer mechanism 20, e.g. it is initially picked up by a blockholder cradle 20 on a so-called walking-beam 21 of a transfer mechanism, this walking-beam type of transfer mechanism is described in detail and claimed in the commonly owned continuation-in-part application, Serial No. 263,383, filed March 4, 1963. Actually, this walking-beam includes a pair of parallel bars 21–1 and 21–2, as seen most clearly in FIGURE 7; the walking-beam transfer mechanism serves to transfer the blocks C in sequence longitudinally through the machine step-by-step toward the right in a direction parallel with and positioned generally between the pair of main frame members 22 and 24 of the machine. The transfer mechanism 21 is operated by suitable motive mechanism, for example by hydraulic or electric drive mechanism. In this machine as shown, the transfer mechanism is operated by an electric motor and drive apparatus which are enclosed within the protective housing 23 (FIGURE 2) below the beam members 22 and 24 at the lower right end of the machine. In operation the walking beam 21 is periodically elevated and lowered, and it is reciprocated longitudinally when it is in its elevated position for advancing the components C from station-to-station through the machine. One of the lever arms for raising and lowering the walking beam 21 is seen at 27 in FIGURE 2.

It is noted that this machine is adapted to handle different sizes of components C interchangeably. In this example, the machine interchangeably and automatically handles four-cylinder and six-cylinder engine blocks. The broken line 25 indicates the postion of the leading end of a four-cylinder engine block, and the position of the leading end of a six-cylinder block is indicated at 26 (FIGURES 2 and 6).

During operation each of the components C in sequence is transferred by the walking beam 21 from station 1 to station 2, and then the component pauses briefly at station 2. The component C is then transferred from station 2 to station 3 which is within the main housing 28 of the machine. There is a door (not shown) in the housing 28 at the input end of the machine for admitting each component C. As the walking-beam transfer mechanism moves the component C into station 3, the component C is automatically received into a fixture 30 (FIGURES 6 and 7) extending radially from one of the horizontal rotatable arms 32 of a revolving indexing carriage apparatus 34 (FIGURES 5 and 8). As seen most clearly in FIGURE 8, the indexing carriage 34, which is shown in this illustrative embodiment of the invention, a plurality of radial arms 32, for example, eight radial arms with an equal number of fixtures 30 affixed to the respective outer ends of these arms.

An indexing drive mechanism 36 (FIGURES 4 and 5) serves to index the carriage 34 into various successive angular positions about its own axis, for example, shown here as being a vertical axis. During operation of this indexing drive mechanism which will be described in greater detail further below, the carriage 34 is turned through successive angles of 45° in a clockwise direction as seen from above pausing between each turning, i.e. indexing movements. Consequently, as illustrated in FIGURE 1 by the pair of concentric dashed circles 38, the component C, which is in station 3 aligned with the longitudinal axis of the walking beam 21, is subsequently indexed into station 4 and then is indexed on around pausing briefly at successive stations 5, 6 and 7, each of which is separated by an angle of 45° about the axis of the carriage 34.

When the component C arrives at station 7, it is once again aligned with the longitudinal axis of the walking beam 21. Therefore, as this walking beam is elevated by its operating mechanism, it rises into engagement with the component C in station 7 in preparation for removing this component from the fixture 30. Then, as the walking beam is reciprocated longitudinally toward the right in FIGURE 1, it moves the component C out of the fixture at station 7 and transfers this component onwardly to station 8. It is to be noted that as the walking beam 21 is removing a component from a fixture at station 7, it is also loading another component into another one of the fixtures 30 at station 3.

While the components are positioned in stations 4, 5 and 6, a central washing fluid surge control mechanism, which will be explained in detail further below, acts to clean thoroughly the passageways and cavities within the manufactured component C being washed. In the case of a machine engine block, for example, these passageways and cavities include oil galley passages, valve-stem clearance passages, cylinders, cam shaft and crankshaft bearing openings, cooling water jackets, stud bolt holes, etc. The fixtures 30 are arranged to rotate the component C into different positions so as to provide a highly effective internal and external washing action as is explained in detail further below.

During the full indexing sequence from station 3 around to station 7, the component has been revolved through an angle of 180° so that it has been turned end-for-end. As the component rests briefly at station 8, any washing liquid which has not previously drained from the component as it was removed from station 7 now has an opportunity to drain away. The stations 3–8 comprise the washing section 39 of the machine as a whole.

From station 8 the component is transferred into station 9 where it is received into a radial fixture of a second indexing carriage 34 (FIGURE 11), which is substantially identical to the first indexing carriage 34. The dashed concentric circles 40 (FIGURE 1) indicate the action of this second indexing carriage which revolves the component from station 9 into the successive stations 10, 11, 12 and 13.

In this illustrative embodiment of the invention, each component C is revolved by each of the two carriages 34 through an angle of 180°. It is to be noted that this apparatus lends itself very well to a wide variety of installations for different arrangements of mass-production automobile engine lines or similar mass-production lines and wherein the carriages 34 in the washing section 39 and in the drying section 42 serve to revolve the components C through other angles than 180° as may be desired. For example, where it is desired to have the manufactured components C be issued from the machine in a direction along a second production line parallel to the incoming line but travelling in the opposite direction, then the first indexing carriage 34 in section 39 may be arranged to revolve the components C through an angle of 90° or 270°, and the second indexing carriage 34 in section 42 is then arranged also to revolve the components C through another respective angle of 90° or 270°, as the case may be. Various transfer arrangements may be used to transfer the components from one indexing carriage to another, as will be understood. These indexing carriages 34 may be revolved in opposite directions and also may be arranged to revolve the components C through relatively different angles, and the components may be relatively inverted by these indexing carriages, as will be understood from this specification, for use in different production installations.

While the component C is positioned at these stations 9–13, it is subjected to strong blasts of dry air for completely drying all areas and regions of the component. Then the walking beam transfer mechanism successively transfers the component into stations 13, 14, 15, 16 and 17. In passing from station 13 to station 14, it passes out through a suitable door (not shown) at the right end of the main housing 28. At station 17 the component enters an assembly line. The stations 9–13 comprise the blow-off section 42 of the machine as a whole.

The operator's control panel 44 is positioned near stations 15 and 16 so that he can conveniently observe the cleaned components C as they are automatically being delivered from the machine.

In order to index the indexing carriage 34 into various angular positions about its axis, there is provided an indexing drive mechanism 36 (FIGURES 3 and 4), as mentioned previously. This indexing drive mechanism includes an electric motor 45 connected by a pair of V-belts 46 to a pulley 47 of a speed-reducing gear mechanism 48. Extending from the bottom of this speed-reducing mechanism 48 is a shaft fastened to a sprocket 49 for driving a chain 50 so as to turn slowly a large driven sprocket 51. This sprocket 51 rotates a hollow shaft 52 which drives an indexing-and-locking apparatus, indicated at 54, serving to turn a large hollow shaft 55 intermittently. During the periods when the shaft 55 is stationary, the indexing-and-locking apparatus 54 serves positively to lock the shaft 55 against inadvertent rotation. Thus, the fixtures 30 are held rigidly stationary in their desired positions at the respective stations 3 to 7 in between the periods when the indexing-and-locking apparatus 54 is revolving the carriage 34. A highly effective indexing-and-locking apparatus 54 is described in detail and is claimed in a copending application Serial No. 112,338, filed May 24, 1961, now Patent No. 3,094,207. However, it is to be noted that any suitable mechanism, for example, such as the indexing-and-locking mechanism shown in U.S. Patent 2,979,062, can be used at 54. The requirements for this mechanism 54 is that it should periodically turn the hollow shaft 55 through a predetermined angle, in this example the angle is 45°. It should lock the shaft 55 in place when it is pausing between movements. Also, the apparatus 54 should be arranged to provide a smooth angular acceleration and a smooth deceleration to the shaft 55 so as to avoid jerky movements, because the indexing carriage 34 together with its radial arms 32 and fixtures 30 and the plurality of automobile engine blocks C being supported and moved thereby has a large moment of inertia.

As shown in FIGURE 5, the large hollow shaft 55 at the bottom of the indexing-and-locking apparatus 54 is connected to a collar 56 which is secured to the top of a long hollow shaft 58. This long shaft 58 is supported by a roller-type thrust bearing 60 which is positioned beneath the collar 56.

In order to support the bearing 60, a pair of large box beams 63 and 64 extend longitudinally of the mechanism just beneath the housing 28. There are lateral beams 65 extending between the beams 63 and 64, and a bearing support assembly 66 is carried by these beams 65.

For purposes of lubricating various bearings in the indexing carriage apparatus 34 (FIGURE 5), a lubrication fitting 57 is provided at a conveniently accessible location on the machine and is connected by a lubrication conducting passage or tube 59 with the internal channel 61 in a lubrication transfer collar manifold 62. This transfer manifold 62 maintains a tight sliding seal between an inner stationary ring 53 and the outer collar 71 which rotates with the indexing carriage 34. An outlet 75 in the outer collar 71 is connected by suitable tubing 87 to the bearings to be lubricated.

At the lower end of the hollow shaft 58 is a collar 67 which is detachably connected as by bolts to a similar collar 68 at the top of the indexing carriage 34, and these collars 67 and 68 are keyed together by a large key as indicated at 69 so as to control the movement of the indexing carriage 34 positively. The collar 68 is rigidly secured as by welding to the top of hub means 70 shown in the form of a hub sleeve member. Extending from the hub means 70 out to the periphery 72 of the indexing carriage 34 are supporting means 73 shown as eight radial web spokes rigidly secured to this hub sleeve 70. The periphery 72 is formed by an octagonal casing support, and the web spokes 73 are secured at the corners thereof. In order to lighten the structure, circular cut-outs are made in these web spokes 73, and to stiffen the structure, a plurality of diagonal braces 74 are included as shown in FIGURE 8.

Fastened to the lower end of the hub sleeve 70 is a mounting ring 76, and attached to the bottom of this mounting ring 76 is a valve housing 77 which has an octagonal shape and forms a part of the centralized washing fluid surge control mechanism as will be explained in detail further below.

The rotatable radial arms 32 each comprise a strong rotatable tubular member 78 having a mounting plate 79 secured by ribs 80 to its outer end. The inner end of each tubular member 78 is journaled in an inner support sleeve bearing 81 within the valve housing 77. As shown in FIGURE 5, a liquid seal is formed about each rotatable tube member at each face of the valve housing 77 by means of a resilient O-ring gasket 82 held in place by a clamp ring 83.

In order to support the outer end of each tubular member 78, there are bearing enclosures 84 mounted on the faces of the octagonal casing support 72, and within each bearing enclosure is a sleeve bearing 85.

For the purpose of rotating each of the tubular members 78, a bevel pinion gear 86 is attached to each tubular member 78 between its inner bearing 81 and outer bearing 85, and these bevel gears all are engaged by a large ring bevel gear 88 mounted on a movable bracket 90. This movable bracket 90 is secured to a movable control sleeve 91 which surrounds a fixed hollow cylindrical supporting base 92. The upper and lower ends of the movable control sleeve 91 are held by bearings 93 and 94, respectively, and a radial control arm 95 is secured to the lower end of the sleeve 91 to control the angular position of the ring bevel gear 88. The outer end of this radial control arm 95 is connected to suitable arm-position control means 96 for swinging the arm back and forth about the cylindrical base 92 as may be desired. In this example, the arm 95 is pivotally connected by a bolt 97 to a piston rod 98 which is actuated by a hydraulic cylinder 99 pivotally mounted by means of a pin 100 connected to a frame bracket 101.

To support the weight of the ring bevel gear 88 and the movable control sleeve 91, a thrust bearing 102 rests upon a base plate 104 which is supported by a hollow U-shaped box beam 106 integrally secured to the main frame members 22 and 24. Moreover, as shown in FIGURE 9, there are lateral frame braces 107 and 108 which are rigidly secured to the U-shaped beam 106 and extend out to the side framework 110 adjacent to the interior of opposite sides of the main housing 28.

In order to wash the automobile engine blocks C, the lower portion of the housing 28 is formed into a tank, as illustrated in FIGURES 9 and 11, for holding a reservoir 112 of suitable washing liquid. For example, this washing liquid 112 is water containing rust inhibitors, foam suppressants, and cleaning compounds such as are conventionally used in industrial power washers for washing automobile engine blocks. The washing liquid in this reservoir 112 is drawn into a suitable centrifugal pump 114 (FIGURE 1) of the non-clogging type, for example one of the pumps such as is disclosed in U.S. Patents Nos. 2,873,685 and 2,890,660. This pump 114 is driven by a large electric motor 116, and the pump is capable of delivering 1,500 gallons per minute at a pressure of 70 pounds per square inch. The washing liquid is discharged from the pump 114 into a supply duct 118 which is connected into the hollow interiors 119 (FIGURES 5 and 9) of the two longitudinal main frame members 22 and 24. Thus, these frame members 22 and 24 provide the multiple functions of giving structural support to the machine parts and to the components C being handled in the machine and also of acting as liquid supply mains for conducting the washing liquid under pressure to the locations in the machine where it is effectively utilized for cleaning the engine blocks C.

As shown in FIGURES 5 and 9, the U-shaped hollow box beam 106 is connected to the interiors 119 of both of the liquid-supply conduit beams 22 and 24, and this U-shaped beam 106 forms liquid conducting means for conducting the liquid downwardly and then inwardly under pressure into a central supply port 120 at the bottom of the cylindrical supporting pedestal 92. From this port 120 the pressurized liquid flows upwardly through liquid conducting means formed by the inside of the fixed pedestal 92. Thus, the liquid is conducted up through the pedestal 92 to a central surge flow control valve mechanism 122, which controls the flow of the pressurized washing liquid out through the various rotatable tubular members 78. The valve means 122 produces a powerful intermittent surging flow of the pressurized washing liquid travelling outwardly through the bores of the respective tubular members 78 when they are successively positioned at stations 4, 5 and 6, as indicated by the respective liquid flow arrows 124, 125 and 126 (FIGURE 5A). In addition to the improved effectiveness of the pulsing flush-out, the output flow from the pump is used more efficiently because substantially all of the flow is directed into one fixture 30 at a time.

As described in detail further above, each engine block C is loaded into one of the radial fixtures 30 at station 3 and is indexed successively to stations 4, 5 and 6 and then is unloaded from the fixture 30 at station 7.

To supply the flows of pressurized washing liquid 124, 125 and 126 out through the tubular members 78 at stations 4, 5 and 6, the upper end of the stationary cylindrical pedestal 92 has three outlets 127, 128 and 129 (FIGURE 8A) which are oriented at the same angles as are the respective tubular members 78 when they are in these three stations 4, 5 and 6, that is, the centers of these three outlets 127, 128 and 129 are angularly positioned 45° apart about the axis of the pedestal 92. Accordingly, the fluid flow is blocked off from the other tubular members 78 at other angular positions wherein no fluid flow is desired, for example, as shown, the flow is blocked off from the tubular members 78 when in stations 3 and 7, and when in positions other than stations 4, 5 and 6. For providing the maximum flow capacity within the space available, and for providing rapid on-and-off flow action with only a slight angular movement within the valve mechanism 122, these three outlets 127, 128 and 129 are each generally rectangular in shape. Their axial length is preferably more than twice their width as measured in the circumferential direction, and in this example, their axial length is three times their circumferential width. The octagonal valve housing 77 has eight radial passages 130 therein aligned with the inner ends of the rotatable tubular members 78. Within a large axial opening in the valve housing 77, there is a revolving transition bushing 132 which is rigidly secured to the housing 77 so as to be indexed from position-to-position with the housing. This transition bushing 132 serves as a replaceable wear-receiving member, and it revolves about the stationary upper end of the pedestal 92 and has gasket means at 134 and 136 (FIGURE 5A) which form sliding liquid-tight seals above and below the three outlets 127, 128 and 129. The respective bearings 81 and 85 are lubricated by suitable tubing connected to the lubrication distribution fitting 89 which is connected to the tube 87.

There are eight radial openings 138 in the transition bushing 132 which are directly aligned with the passages 130 in the valve housing. To provide the maximum flow capacity within the space available and also to serve as a transition between the elongated outlets 127, 128 and 129, and the circular passages 130, the openings 138 are wider than these outlets, but are not so long, being elongated somewhat in the axial direction and preferably having a length at least one and one-half times their circumferential width.

Thus, advantageously, as is shown most clearly in FIGURES 5A and 8A, the pressurized liquid 140 flowing up through the interior of the hollow pedestal supporting means 92 can flow out through the respective outlets 127, 128 and 129 and through the radial openings 138 and then through the radial passages 130 into the bores of the rotatable tubular members 78. By virtue of the axial, i.e. vertical, elongation of the respective outlets 127, 128 and 129 and of the radial passages 138, the cross-sectional area of the flow path passing therethrough is as large as the cross-sectional area of the bore of each tubular member 78. Consequently, a large flow capacity is provided for assuring a high pressure delivery of the washing liquid out through the tubular members 78 into the radial fixtures 30 providing advantageous cleaning results as described further below. Effectively, the passages 138 in the coupling sleeve 132 provide a transition between the taller, narrower openings 127, 128 and 129 in the cylindrical supporting pedestal 92 and the circular passages 130 in the octagonal valve housing 77 so as to provide a substantially uniform cross-sectional area of flow path for the flowing liquid 124, 125 and 126.

During the rotary indexing movement of the indexing carriage apparatus 34, the valve housing 77 together with the coupling sleeve 132 intermittently revolves around the upper end of the cylindrical supporting pedestal 92. Accordingly, in sequence, the pressurized cleaning liquid is supplied at high velocity through the outlets 127, 128 and 129 through the tubular members 78 to the respective fixtures 30 which are in the stations 4, 5 and 6.

In order to provide a highly efficient surging flow producing an intense pulsating action for dislodging dirt and chips from within the interior openings and passages of the machined automobile engine blocks C, there is an inner continuously rotating valve means 142 which periodically shuts off the flow through the respective outlets 127, 128 and 129. In this example of the invention, this rotating valve means 142 comprises a hollow sleeve valve which is rotating within the upper end of the cylindrical pedestal 92 adjacent to the outlets 127, 128 and 129. This sleeve has a valve port 144 adapted to become aligned in succession with the respective outlets 127, 128 and 129 as the valve 142 is rotated. Therefore, as the valve 142 continues to rotate, the cleaning liquid intermittently surges out along the flow paths 124, 125 and 126. During the periods when the liquid flow is shut off by the valve 142 from the paths 124, 125 and 126, the result is an increase in pressure within the conduit mains 119 within the frame members 22 and 24. This increased pressure is consequently supplied to the other spray nozzles within the machine for enhancing their cleaning action. Thus, none of the pressure of the cleaning liquid is wasted, but it is utilized most efficiently for the automatic cleaning of the machined engine blocks.

For purposes of providing a rapid increase in pressure and in flow rate along the respective paths 124, 125 and 126 while avoiding any "water hammer" such as would occur from the sudden interruption of a rapid flow of liquid in a closed conduit, the port 144 in the rotating sleeve valve 142 is effectively tapered with respect to the boundaries of the respective outlets 127, 128 and 129 with which it cooperates. For example, as shown in this embodiment of the invention, the boundaries of the outlets 127, 128 and 129 extend in an axial, i.e. vertical direction, and the valve port 144 has generally the shape of a parallelogram. Thus, the leading and trailing boundaries of the valve port 144 are inclined with respect to lines parallel with the axis of the valve sleeve 142. In FIGURE 5, the valve sleeve 142 rotates in a clockwise direction, and in FIGURE 5A the inclined trailing edge 146 of the valve port is shown. Specifically, this valve port has the shape of a parallelogram wrapped about a cylindrical surface with two of the boundaries, i.e. the top and bottom in FIGURE 5A, extending in a circumferential direction.

Preferably, the valve port 144 extends a substantial distance in the circumferential direction so as to span more than one of the outlets 127, 128 and 129. In this way the liquid flow is smoothly diverted from one of these outlets to the next outlet. In this embodiment of the invention, the valve port 144 spans two of the outlets plus the intervening solid portion of the pedestal 92, and thus the maximum flow is established into the succeeding outlet 128 or 129 before the flow begins to be shut off from the preceding outlet 127 or 128.

Figure 3:
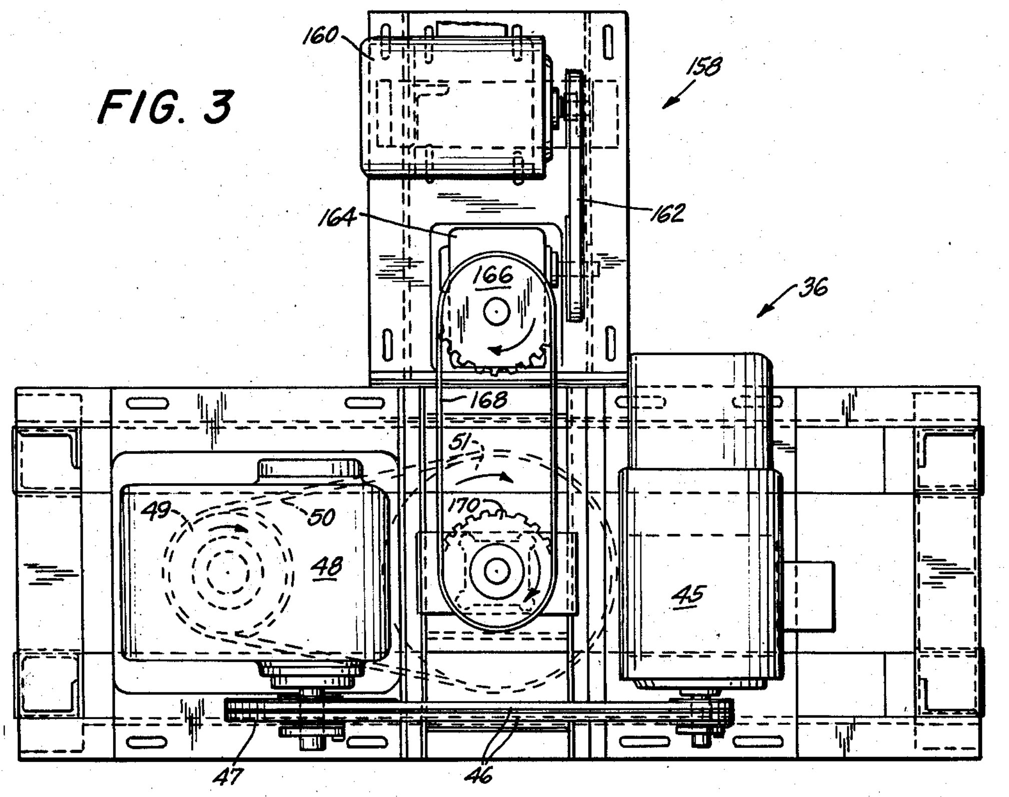
FIGURE 3 is a top plan view of the drive mechanism and the washing liquid central flow surge control mechanism, which is also schematically illustrated at the left center of FIGURE 1.
Figure 4:
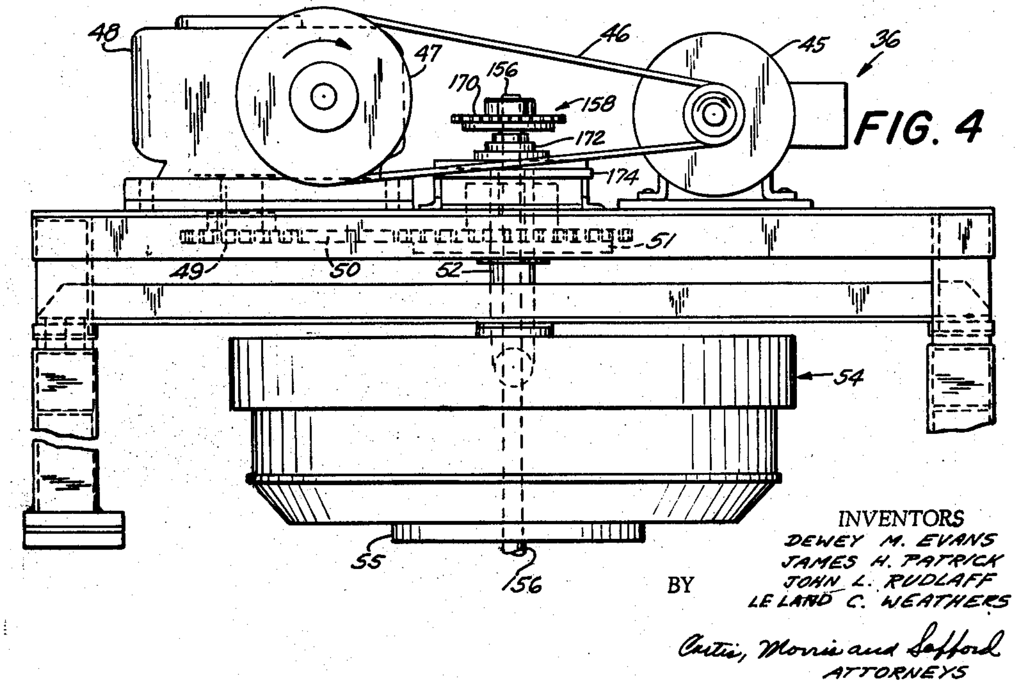
FIGURE 4 is a side elevational view of the drive mechanism and the washing liquid central flow surge control mechanism shown in FIGURE 3.

As shown in FIGURE 5A, the upper end of the pedestal 92 is covered by a cap 148 containing a bearing 150, and a valve-operating shaft 152 is journaled in this bearing 150. The upper end of this shaft 152 is detachably connected by a coupling 154 to a long rotating vertical shaft 156 which extends upwardly through the hollow shaft 58 and up through the indexing-and-locking mechanism 54 to a valve-operating drive mechanism 158 (FIGURES 3 and 4).

This drive mechanism 158 includes an electric motor 160 coupled by a V-belt 162 to worm gear speed-reducer means 164 having an output sprocket 166, which is connected by a chain 168 to a sprocket 170 connected to the top end of the rotating shaft 156. A bearing 172 (FIGURE 4) on a mounting bracket 174 supports the upper end of this shaft 156.

As mentioned previously, the walking beam transfer mechanism 21–1 and 21–2 automatically loads the engine blocks into the fixtures 30 in station 3 and unloads them therefrom in station 7. In FIGURE 5 there is shown the low position of the two walking beam members 21–1 and 21–2 which they occupy during the return stroke of the transfer mechanism. During the forward stroke of this transfer mechanism, these beam members are elevated to the positions 21–1′ and 21–2′. Advantageously, the lateral spacing between these walking members 21–1 and 21–2 is increased in the region beneath the indexing carriage apparatus 34 so that they conveniently straddle the cylindrical supporting base pedestal 92 and the associated apparatus.

There are washing jet systems including liquid conduits such as manifold 176 having spray jets 178 which are supplied from the liquid supply mains 119 formed by the frame members 22 and 24. These spray jets 178 aid in washing-off the exteriors of the engine blocks C as the blocks are rotated by the fixtures 30 and indexed into and out of the stations 4, 5 and 6.

As shown in FIGURE 7, when the transfer mechanism is in its elevated position and also is in its advancing stroke, it automatically loads an engine block C into the radial fixture 30. This fixture 30 includes hollow mounting means 180 which is rigidly secured as by bolting to the mounting plate 79 at the outer end of the rotating tubular members 78. The mounting means 180 is formed by a pair of generally circular heavy steel discs 181 and 182 which are rigidly interconnected by a peripheral wall 183 so that this mounting means provides a hollow header chamber 185 for reasons explained in detail further below. The disc 181 has a central opening 184 which mates with the outer end of the tubular member 78 so that the surging liquid can enter the chamber 185. It will be noted that the lower edge portion 186 of the mounting header means 180 is shaped by flattening so as to provide clearance for movement of the transfer mechanism 21–1 and 21–2 therebeneath.

In order to provide means for supporting the manufactured component C, such as an engine block, in the fixture 30, this fixture includes a pair of component-holding arms 187 and 188 which are rigidly secured to detachable fastening means in the form of a pair of fastening plates 189 and 190 connected to the disc 182 by bolts 192. The disc 182 is made larger than the disc 181 so that its projecting edge can be used for connecting the bolts 192 without making holes into the header chamber 185.

Each of the arms 187 and 188 includes three seats 194, 195 and 196, each having an inwardly sloping outer surface 197 for smoothly guiding the engine block C into the fixture 30. These seats are spaced so as to seat against the opposite ends of the pan rail 198 of four-cylinder blocks 25 or six-cylinder blocks 26 as the case may be.

For accommodating model change-overs which may entail engine blocks of different configuration, the arms 187 and 188 are readily replaced by disconnecting the bolts 192.

As shown in FIGURE 7, these machined engine blocks include the crankshaft bearing caps 200 for holding the main crankshaft bearings. The block includes an oil galley passage 202 with branch passages 203 communicating with the crankshaft bearing opening 204 and other branch passages 205 communicating with the cam shaft bearing opening 206.

In order to flush thoroughly the block C and especially these interior passages, the fixture 30 advantageously has several manifolds, which include an elongated hollow mandrel 208 for extending through the crankshaft bearing openings 200 and having a plurality of lateral orifices 210 in its cylindrical wall 212. This mandrel 208 has a flange 214 at its inner end which is detachably secured as by machine screws to the disc 182, and the end of the mandrel mates with an opening 216 through the disc 182 into the header chamber 185 so that the interior of the mandrel is supplied with the surging pressurized cleaning liquid from this chamber 185.

As shown in FIGURE 7, some of these lateral orifices 210 are oriented so as to be aligned directly with the passages 203 for forcefully flushing them out. The mandrel can readily be removed and replaced to accommodate later models of engines at the model change-over which occurs in the automobile manufacturing industry. In certain instances a second mandrel is included at 218 in the fixture 30 for insertion into the cam shaft bearing openings 206 and having orifices therein aligned with the oil passages 205, and in certain instances only the cam shaft mandrel 218 may be used. For most engine blocks it is found preferable to utilize the crankshaft bearing mandrel 208 either alone or in conjunction with the cam shaft bearing mandrel 218 so as to provide a thorough cleaning action.

For supporting and washing off the top portion of the engine block C, a spray jet mainfold 220 is connected by a fastening plate 222 to the disc 182. This manifold 220 is formed by a pair of parallel pipes 223 and 224 secured to the fastening plate 222 and supplied with liquid from the chamber 185. The outer ends of these pipes 223 and 224 are held together by a strap 226.

These pipes each have a large plurality of spray jet openings 228 which are directed so as to flush out the cylinders, stud bolt holes, water jacket passages and similar openings at or near the top of the block C and to clean off the exterior of the block.

The manifold 220 also serves as a component-holding arm, including seats 230 and 231 which define right-angle seating surfaces 232 for engaging the top and side of the four-cylinder or six-cylinder block. The outer corners of these surfaces are tapered inwardly at 233 for guiding the block into place as it is loaded into the fixture 30.

A motor 235 (FIGURE 1) drives a blower 236 for sucking fumes out of the housing 28. The sludge resulting from the washing operation is removed from the bottom of the housing 28 by a suitable sludge conveyor 237 (FIGURE 2) driven by a motor 238.

As shown in FIGURES 10 and 11, the engine blocks C are dried off by air which is drawn in through a steam-heated air-heating radiator 240 (FIGURE 1) having suitable steam supply lines 241. A motor 242 drives a large blower 244 which draws in through this radiator 240 and which blows the heated air down into the blow-off chamber 246 containing indexing apparatus 34 and fixtures 30 similar to those described before, except that they are supplied with heated air. There are various large ducts 247, 248 and 249 and a baffle 250 in the blow-off chamber for directing the heated air onto the components to be dried.

As explained above in connection with FIGURE 6, it is the outer end of fixture 30 which is the common location for the ends of both 4-cylinder and 6-cylinder blocks. However, because the blocks have been turned end-for-end during their progression from station 3 to station 7, it is the inner end of the respective fixtures which is the common location for the ends of both 4-cylinder and 6-cylinder blocks. This relationship is illustrated in FIGURES 10 and 11, wherein the end of a 4-cylinder block is at 25 and the end of a 6-cylinder block is at 26.

During operation the ring gear 88 (FIGURE 5) can be held stationary, in which event the fixtures 30 only rotate about their axis when the carriage 34 is being indexed from station-to-station. Alternatively, the control mechanism 99, 98, 95 and 91 can be actuated whenever the transfer mechanism is clear of stations 3, 7, 9 and 13. In this way the components being cleaned can be turned to various advantageous positions for internal flush-out. Also, the components can be rocked back and forth by this mechanism into various angular positions so that the rocking movement facilitates the thorough flush-out of complex internal passages. This angular rocking movement encourages the fluid to surge into various tortuous passages within the component being cleaned.

From the foregoing description it will be understood that the power washing method and apparatus of the present invention are well adapted to provide the many advantages discussed above, and that they can be adapted to a wide variety of industrial washing and cleansing operations and that various changes or modifications may be made therein, each as may be best suited to a particular application, and that the scope of the present invention as defined by the following claims is intended to include such modifications or adaptations limited only by the prior art.

What is claimed is:

1. An automatic power washing machine for cleaning automobile engine blocks and similar types of engine blocks and the like components in a mass-production line comprising transfer mechanism arranged to transfer the components into and out of the machine, a source of washing fluid under pressure, a revolvable carriage, fluid conducting means for conducting the washing fluid from said source to said carriage, indexing means for turning said carriage about an axis to various angular positions, a plurality of fixtures carried by said carriage, said fixtures being at spaced positions around the axis of said carriage, said fixtures being adapted to receive and support components transferred thereto by said transfer mechanism, means for rotating said fixtures on said carriage, and a plurality of manifolds being connected to said fluid conducting means and having fluid ejecting openings which are operatively associated with respective fixtures for cleaning the components carried by said fixtures.

2. An automatic power washing machine for cleaning automobile engine blocks and similar types of engine blocks and the like components as claimed in claim 1 and wherein said fluid conducting means is coupled to said carriage at the axis thereof, at least one of said manifolds being carried by said carriage, a plurality of fluid conducting conduits extending from said fluid conducting means to said carriage manifolds, and valve means positioned at the axis of said carriage for controlling the distribution of the fluid to the respective conduits.

3. A machine as described in claim 2 for cleansing components having complex interior configurations with passages therein, wherein at least one of said carriage manifolds is a mandrel positioned to extend into passages of components loaded into said fixtures.

4. A machine as described in claim 2 wherein said valve means includes a hollow stationary valve plug whose exterior conforms to a surface of revolution and having an axial inlet with at least one radially oriented outlet, a valve housing having a chamber adapted to receive snugly said valve plug, said housing being mounted on said carriage and connected to said fluid conducting conduits and having a plurality of angularly spaced radial openings from said chamber to said conduits which are adapted sequentially to align with the outlet of said valve plug as said carriage rotates.

5. A device as described in claim 4 wherein said valve means further includes a rotatable sleeve mounted within said valve means as a barrier between said axial inlet and said valve housing openings, said sleeve having an orifice oriented therein to interrupt intermittently the barrier interposed by the sleeve as the latter rotates, thereby producing a pulsating flow from said valve means for enhancing the cleaning action of said carriage manifolds.

6. An automatic power washing machine for cleaning automobile engine blocks and similar types of engine blocks and the like components in a mass-production line comprising transfer mechanism arranged to transfer the components into and out of the machine, a source of washing fluid under pressure, a revolvable carriage, fluid conducting means for conducting the washing fluid from said source to said carriage, indexing means for turning said carriage about an axis to various angular positions, a plurality of fixtures carried by said carriage, said fixtures being at spaced positions around the axis of said carriage, said fixtures being adapted to receive and support components transferred thereto by said transfer mechanism, a plurality of manifolds having fluid-ejecting openings, at least one of said manifolds being carried by said carriage and being connected to said fluid conducting means, said manifolds being operatively associated with respective fixtures for cleaning the components carried by said fixtures, valve means on said carriage for controlling the distribution of the washing fluid to said carriage, manifolds, a rotatable sleeve mounted within said valve means as a barrier between said fluid conducting means and said carriage manifolds, said sleeve having an orifice oriented therein to interrupt intermittently the barrier interposed by this sleeve as it rotates, thereby producing a pulsating flow from said valve means, and rotary drive means connected to said sleeve for controlling rotation of said sleeve.

7. An automatic power washing machine for cleaning automobile engine blocks and similar types of engine blocks and the like components in a mass-production line having complex interior configurations with passages therein, said machine comprising a source of washing fluid under pressure, a revolvable carriage, fluid conducting means for conducting the washing fluid from said source to said carriage, indexing means for turning said carriage about an axis to various angular positions, a plurality of fixtures carried by said carriage and extending outwardly therefrom at spaced positions around the axis of said carriage and being adapted to receive and support the components to be cleaned, transfer mechanism for loading components into said fixtures, a plurality of elongated hollow mandrels carried by said carriage and extending outwardly therefrom adjacent to said fixtures for extending into the passages of components loaded into said fixtures, the interiors of said mandrels being connected to said fluid conducting means, said mandrels having fluid-ejecting openings therein for cleaning the interiors of said components carried by said fixtures, said mandrels being mounted upon said fixtures, rotatable bearing means supporting said fixtures on said carriages, and fixture-rotation means for rotating said fixtures on said carriage for enhancing the cleaning action of said mandrels.

8. An automatic power washing machine as claimed in claim 7 and wherein said fixture-rotation means includes a plurality of gears on said carriage, each of said gears being connected to one of said fixtures, and a large gear in the machine engaging said plurality of gears for controlling the rotation of said fixtures.

9. An automatic power washing machine for cleaning automobile engine blocks and similar types of engine blocks and the like components in a mass-production line having complex interior configuration with passages therein, said machine comprising a source of washing fluid under pressure, a revolvable carriage, fluid conducting means for conducting the washing fluid from said source to said carriage, indexing means for turning said carriage about an axis to various angular positions, a plurality of fixtures carried by said carriage and extending outwardly therefrom at spaced positions around the axis of said carriage and being adapted to receive and support the components to be cleaned, transfer mechanism for loading components into said fixtures, a plurality of elongated hollow mandrels carried by said carriage and extending outwardly therefrom operatively associated with said fixtures for entering into the passages of components loaded into said fixtures, the interiors of said mandrels being connected to said fluid conducting means, said mandrels having openings therein for supplying the fluid into the interiors of said components for thorough cleaning thereof, valve means in said fluid conducting means for intermittently surging the fluid into the interiors of said components for enhancing the cleaning action, said manifolds and mandrels being mounted upon said fixtures, rotatable bearing means supporting said fixtures on said carriages, and fixture-rotation means for rotating said fixtures together with said manifolds and mandrels while the components are held in the fixtures.

10. An automatic power washing machine for cleaning automobile engine blocks and similar types of engine blocks and the like components in a mass-production line having complex interior configurations with passages therein, said machine comprising transfer mechanism arranged to transfer the components into and out of the machine, a source of washing fluid under pressure, a revolvable carriage, fluid conducting means for conducting the washing fluid from said source to said carriage, indexing means for turning said carriage about an axis to various angular positions, a plurality of fixtures carried by said carriage, said fixtures being at spaced positions around the axis of said carriage, said fixtures being adapted to receive and support components transferred thereto by said transfer mechanism, a plurality of manifolds carried by said carriage and being connected to said fluid conducting means, said manifolds being operatively associated with respective fixtures for cleaning the exterior surfaces of components carried by said fixtures, a plurality of elongated hollow mandrels carried by said carriage and operatively associated with said respective fixtures and manifolds for entering into the passages of the components loaded into said fixtures, the interiors of said mandrels being connected to said fluid conducting means, said mandrels having openings therein for supplying the fluid to the interiors of said components, whereby the components are washed on their exteriors and in their interiors, said fluid conducting means including valve means for intermittently interrupting the flow of the fluid to said manifolds and mandrels.

References Cited in the file of this patent

UNITED STATES PATENTS

| | | |
|---|---|---|
| 881,575 | Gulke | Mar. 10, 1908 |
| 911,320 | Muller | Feb. 2, 1909 |
| 1,958,846 | Christensen | May 15, 1934 |
| 2,063,702 | Shippy | Dec. 8, 1936 |
| 2,234,909 | Arey | Mar. 11, 1941 |
| 2,239,073 | Arey | Apr. 22, 1941 |
| 2,730,068 | Reynolds | Jan. 10, 1956 |